US010602029B2

(12) United States Patent
Yaser et al.

(10) Patent No.: US 10,602,029 B2
(45) Date of Patent: Mar. 24, 2020

(54) SYNCHRONIZATION OF LASER SCANNING PROJECTOR TO VIDEO SOURCES TO MINIMIZE THE DELAY THEREBETWEEN

(71) Applicants: STMicroelectronics LTD, Netanya (IL); STMicroelectronics S.r.l., Agrate Brianza (IT)

(72) Inventors: Eli Yaser, Tel Aviv (IL); Massimo Ratti, Italia (IT); Naomi Petrushevsky, Yavne (IL)

(73) Assignees: STMicroelectronics LTD, Netanya (IL); STMicroelectronics S.r.l., Agrate Brianza (MB) (IT)

( * ) Notice: Subject to any disclaimer, the term of this patent is extended or adjusted under 35 U.S.C. 154(b) by 51 days.

(21) Appl. No.: 15/941,717

(22) Filed: Mar. 30, 2018

(65) Prior Publication Data
US 2019/0306380 A1 Oct. 3, 2019

(51) Int. Cl.
*H04N 5/06* (2006.01)
*H04N 7/01* (2006.01)
*H04N 9/31* (2006.01)

(52) U.S. Cl.
CPC ............. *H04N 5/06* (2013.01); *H04N 7/0127* (2013.01); *H04N 9/312* (2013.01); *H04N 9/3135* (2013.01)

(58) Field of Classification Search
CPC ........ H04N 5/06; H04N 7/0127; H04N 9/312; H04N 9/3135
See application file for complete search history.

(56) References Cited

U.S. PATENT DOCUMENTS

| | | | |
|---|---|---|---|
| 2008/0061985 A1* | 3/2008 | Strzelczyk | G06K 7/10346 340/572.8 |
| 2011/0001888 A1* | 1/2011 | Brown | G02B 26/085 348/744 |
| 2016/0301898 A1* | 10/2016 | Asada | H04N 9/3164 |
| 2017/0155878 A1* | 6/2017 | Li | H04N 9/3105 |
| 2018/0172981 A1* | 6/2018 | Ishii | G02B 26/0841 |

* cited by examiner

*Primary Examiner* — Michael E Teitelbaum
(74) *Attorney, Agent, or Firm* — Crowe & Dunlevy

(57) ABSTRACT

Described herein is a video projection system including an optical module with at least one collimated light source to generate a light beam and at least one movable mirror to reflect the light beam. The video projection system also includes a video source producing a digital video stream in accordance with a clock signal and a movement synchronization signal, as well as a projector system. The projector system includes mirror control circuitry configured to control movement of the at least one movable mirror in accordance with the clock signal and the movement synchronization signal, a light source controller configured to control generation of collimated light by the at least one collimated light source, and processing circuitry configured to receive the digital video stream, and to generate control signals for the light source controller based upon the received digital video stream.

18 Claims, 4 Drawing Sheets

SYNCHRONIZATION OF LASER SCANNING PROJECTOR TO VIDEO SOURCES TO MINIMIZE THE DELAY THEREBETWEEN

TECHNICAL FIELD

This application is related to the field of laser projection systems, and, in particular, to techniques for synchronizing video sources with laser scanning projectors using minimal buffering, thereby serving to reduce projection delay and reduce production cost.

BACKGROUND

A laser scanning projector or "picoprojector" is a small, portable electronic device. Picoprojectors are typically paired to user devices such as smart glasses, smartphones, tablets, laptops, or digital camera, and used to project virtual and augmented reality, documents, images, or video stored on those user devices onto a projection surface, such as a wall, light field or holographic surface. Laser scanning projectors may also be used in augmented or virtual reality systems.

Such picoprojectors typically include a projection subsystem and an optical module. The paired user device serves an image stream (e.g. video stream) to the projection subsystem. The projection subsystem properly drives the optical module so as to project the image stream onto the projection surface for viewing.

In greater detail, typical optical modules are comprised of a laser source and one or more microelectromechanical (MEMS) mirrors to scan the laser beam produced by the laser source across the projection surface in a projection pattern. By modulating the laser beam according to its position on the projection surface, while the laser beam is scanned in the projection pattern, the image stream is displayed. Commonly, at least one lens focuses the beam after reflection by the one or more MEMS mirrors, and before the laser beam strikes the projection surface, although optical modules of other designs may be used.

The projection subsystem controls the driving of the laser source and the driving of the movement of the one or more MEMS mirrors. Typically, the driving of movement of one of MEMS mirrors is at, or close to, the resonance frequency of that MEMS mirror, and the driving of movement of another of the MEMS mirrors is performed quasi-statically and not in resonance. It is noted that the resonance frequency used for driving one MEMS mirror can vary under different operating conditions.

An issue created in the pairing of a user device to a picoprojector is that the user device treats the picoprojector as a slave of the user device, and serves the image stream according to an internally generated clock, with no coupling between the at least one MEMS mirror and the user device. This may result in a mismatch between the speed at which the image stream is actually received by the picoprojector and the speed at which the picoprojector would need to receive the image stream in order to display the image stream on the fly.

To address this issue, a frame buffer is placed between the user device and the picoprojector. The image stream is served to the frame buffer at the rate it is provided by the user device, and is read from the frame buffer by the picoprojector at the rate required in order to properly display the image stream. While this does properly address the issue, it has the drawback of introducing an undesirable amount of delay between the image stream as served by the user device and the display of the image stream on the projection surface by the picoprojector. There is also the drawback of the cost of the large frame buffer itself.

Therefore, further development in the area of picoprojectors is needed to develop techniques by which the above issues can be addressed, without the above drawbacks.

SUMMARY

Disclosed herein is a video projection system that includes an optical module. The optical module has at least one collimated light source to generate a light beam and at least one movable mirror to reflect the light beam. A video source produces a digital video stream in accordance with a clock signal and a movement synchronization signal. The video projection system includes a projector system, which itself includes mirror control circuitry configured to control movement of the at least one movable mirror in accordance with the clock signal and the movement synchronization signal, a light source controller configured to control generation of collimated light by the at least one collimated light source, and processing circuitry. The processing circuitry is configured to receive the digital video stream and to generate control signals for the light source controller based upon the received digital video stream.

The mirror control circuitry may generate the movement synchronization signal as a function of desired scanning of the light beam in a vertical movement cycle by the at least one movable mirror, with the movement synchronization signal indicating when the at least one movable mirror has completed scanning the light beam in the vertical movement cycle.

In some instances, the video source may receive the clock signal and the movement synchronization signal from the mirror control circuitry. In addition, the clock signal, as received by the video source, may be based upon the clock signal as sent by the mirror control circuitry.

The video projection system may control a frame rate of the digital video stream as a function of the movement synchronization signal.

The video projection system may control a resolution rate of the digital video stream as a function of the movement synchronization signal.

The video source may generate the movement synchronization signal to indicate when a frame of the digital video stream is complete.

The movement synchronization signal may include a frame synchronization signal and a line synchronization signal, with the frame synchronization signal indicating when a frame of the digital video stream is complete, and with the line synchronization signal indicating when a line of a frame of the digital video stream is complete.

The movement synchronization signal may include a frame synchronization signal, and the frame synchronization signal may indicate when a frame of the digital video stream is complete.

In some instances, the mirror control circuitry may receive the clock signal and the movement synchronization signal from the video source.

The mirror control circuitry and light source controller may operate based upon the received clock signal and the received movement synchronization signal so as to effectuate display output of the digital video stream at a same frame rate as the digital video stream.

DETAILED DESCRIPTION

Figure 1:
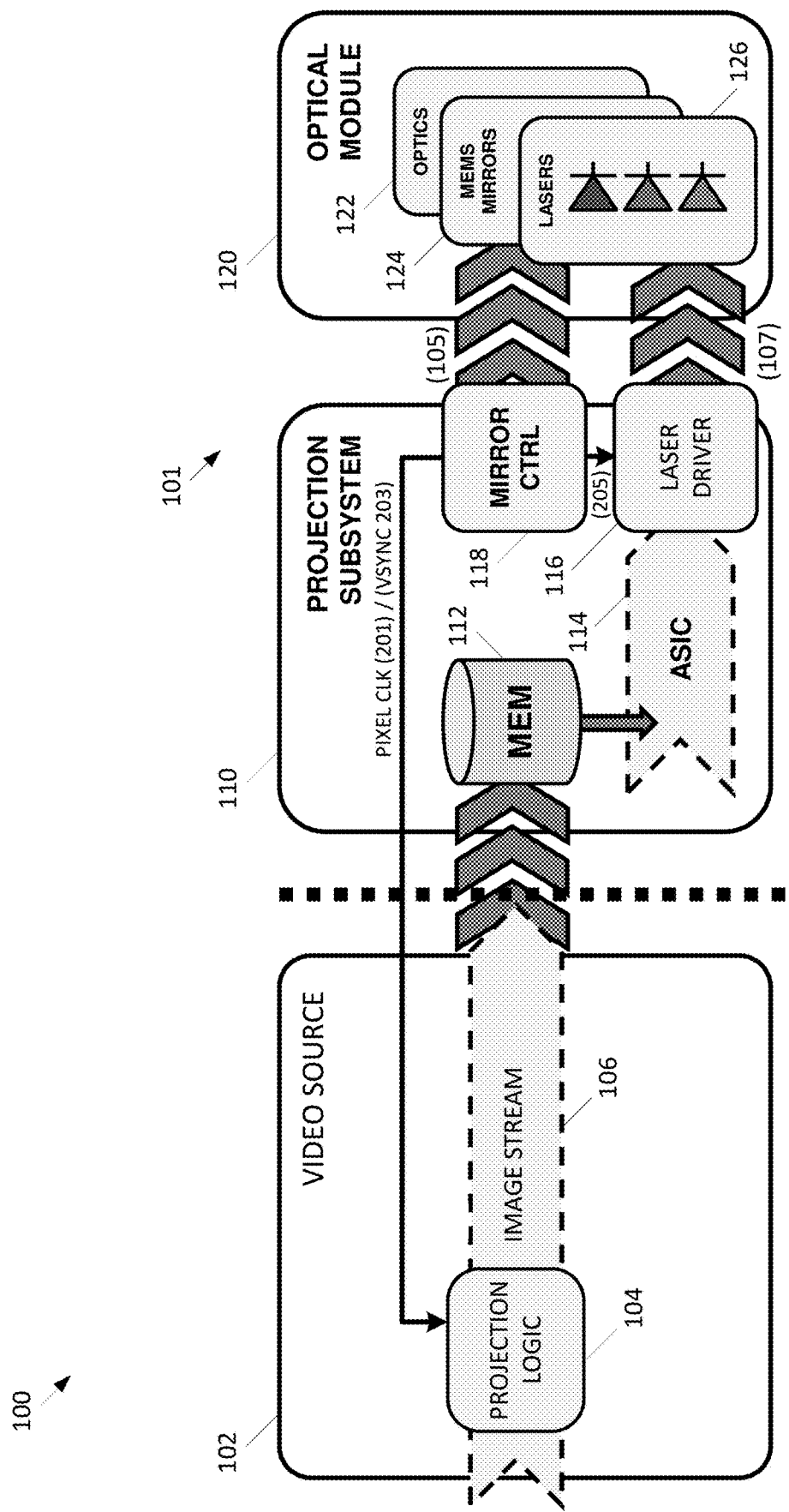
FIG. 1 is a block diagram showing a laser projection system including a video source and a laser scanning projector, in which the video source receives a pixel clock signal and a vertical synchronization signal from the laser scanning projector, in accordance with a first embodiment of this disclosure.

The following disclosure enables a person skilled in the art to make and use the subject matter disclosed herein. The general principles described herein may be applied to embodiments and applications other than those detailed above without departing from the spirit and scope of this disclosure. Prime notation is used to show similar structures that operate differently in different embodiments. Reference numerals in parentheses are used in the drawing figures to denote signals. This disclosure is not intended to be limited to the embodiments shown, but is to be accorded the widest scope consistent with the principles and features disclosed or suggested herein.

Described with reference to FIG. 1 is a laser projection system 100. First, the structure of the laser projection system 100 will be described, and thereafter the operation of the laser projection system 100 will be described. The laser projection system 100 may be a self-contained picoprojector, may be an add-on device for a smartphone, tablet, laptop, or digital camera, or may be contained within a smart glasses or smartphone depending upon the specific application.

The laser projection system 100 includes a video source 102 and a laser scanning projector 101. The video source 102 may be a user's device, such as a smartphone, tablet, laptop, or digital camera. The laser scanning projector 101 includes a projection subsystem 110 electrically coupled to an optical module 120.

The video source 102 includes projection logic 104, which generates an image stream 106.

The optical module 120 includes one or more lasers 126, one or more microelectromechanical (MEMS) mirrors 124, and optics 122 such as lenses. If there is more than one laser 126, a beam combiner combines the produced laser beams into a single laser beam. If there is more than one MEMS mirror 124, then each MEMS mirror 124 oscillates or deflects along a single axis (e.g., X-axis, Y-axis); if there is a single MEMS mirror 124, then that MEMS mirror 124 oscillates or deflects along multiple axes (e.g., X-axis, Y-axis).

The projection subsystem 110 includes a memory 112, which is coupled to receive the image stream 106, and provides output to an application specific integrated circuit (ASIC) 114. The projection subsystem 110 also includes a laser driver 116 that drives the one or more lasers 126 of the optical module 120, and mirror control circuitry 118 which drives the movement of the one or more MEMS mirrors 124.

In operation, the projection logic 104 retrieves static images or video (e.g. from an internal memory of the video source 102, from the Internet, etc), converts the retrieved static images or video into the image stream 106, and transmits the image stream 106 to the memory 112 of the projection subsystem 110, which acts as a small frame buffer, storing less than a single full frame of the image stream 106 (e.g. not even a single frame of the image stream 106 is stored in the memory 112, and only one or more lines of, but less than all lines of, a single frame are stored in the memory 112). The ASIC 114 retrieves the image stream 106 from the memory 112, and processes the image stream 106 so as to determine a modulation scheme for use by the laser driver 116 in generating drive signals 107 for the one or more lasers 126 of the optical module 120.

Figure 2:
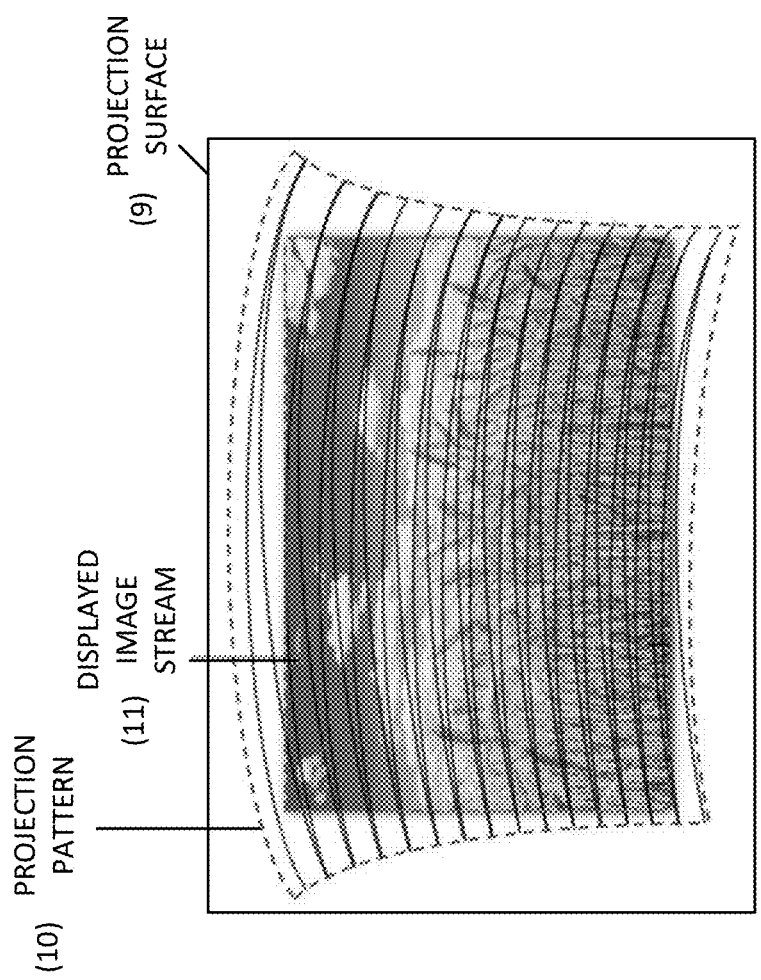
FIG. 2 shows the projection pattern of the laser scanning projector of FIG. 1 as compared to the area within the projection pattern that displays the image stream received from the video source.

The mirror control circuitry 118 generates drive signals 105 that cause deflection or oscillation of the one or more MEMS mirrors 124 of the optical module 120, which (as shown in FIG. 2) serves to scan the single laser beam across the projection surface 9 in a projection pattern 10. The drive signals 107 generated by the laser driver 116 modulate the one or more lasers 126 such that the image stream 106 is displayed as a static or moving image 11 on the projection surface 9 (See FIG. 2).

Of particular note in this embodiment of FIG. 1 is that the mirror control circuitry 118 generates a pixel clock 201 and a vertical synchronization signal 203, and transmits signals 201 and 203 to the projection logic 104. In the case that the one or more MEMS mirrors 124 includes a quasi-statically driven mirror and a mirror driven in resonance, the quasi-statically driven mirror (responsible for vertical beam scanning) is in sync with the resonance mirror (responsible for horizontal beam scanning) in order to guarantee that the geometry of the projection pattern 10 of FIG. 2 does not change, meaning that the number of lines remains constant, and that the projection logic 104 can therefore predict the location of the laser beam on the projection surface 9. Since the resonance frequency of the resonant mirror may change over time, and the quasi-statically driven mirror is driven in sync therewith, the vertical synchronization signal 203 is therefore changed accordingly over time.

The projection logic 104 uses the pixel clock 201 to set the rate at which the image stream 106 is transmitted, as well as the resolution of the image stream itself 106, and interprets the vertical synchronization signal 203 as a frame synchronization signal in the generation of the image stream 206. Thus, the vertical synchronization signal 203 is used to indicate the end of a frame of the image stream 106 and the beginning of the next frame of the image stream 106, setting the frame rate of the displayed image stream 11 produced when the image stream 106 is displayed on the projection surface 9 to be equal to that of the image stream 106.

Since the data rate and frame rate are matched between the video source 102 and the projection subsystem 110, the amount of data stored by the memory 112 for buffering is very small, and is mainly used to provide time for error correction techniques to be performed. Also, the projection logic 104 and its functions can be performed within the video source 102, providing for the capability of adapting the laser scanning projector 105 to a variety of operation modes, optical designs, and projection surface 9 shape allowing the mirror control circuitry 118 and laser driver 116 to remain unchanged. Another option is to have some or all of the projection engine in the projection subsystem 110.

Figure 3:
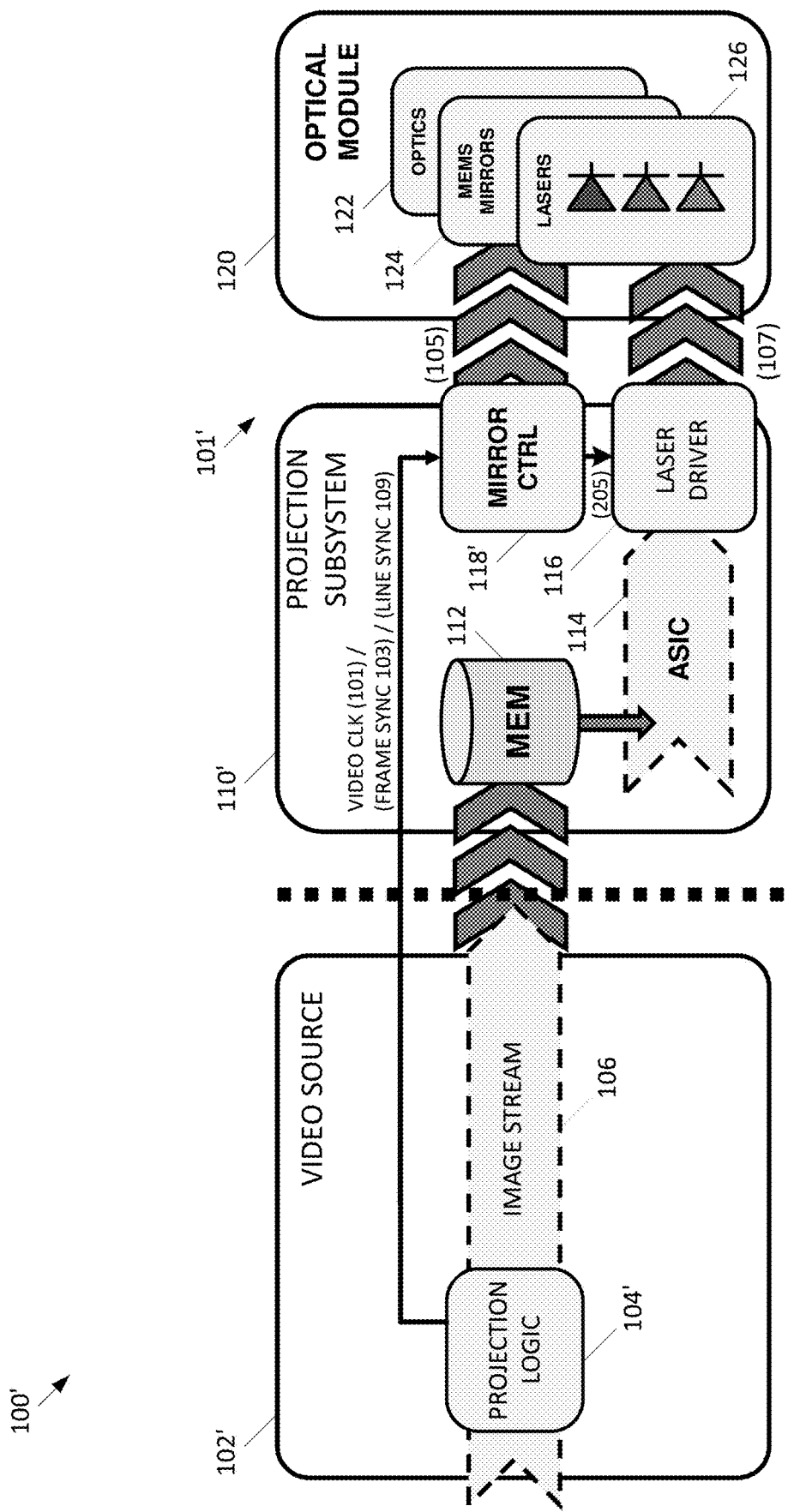
FIG. 3 is a block diagram showing a laser projection system including a video source and a laser scanning projector, in which the laser scanning projector receives a video clock signal, frame synchronization signal, and line synchronization signal from the video source, in accordance with a second embodiment of this disclosure.

An alternative embodiment of laser projection system 100' is now described with reference to FIG. 3. Here, the physical hardware of the video source 102', projection subsystem 110', and optical module 120 remain unchanged, as does the functionality, when compared to the laser projection system 100 of FIG. 1, with one exception. The exception is that in this embodiment, the mirror control circuitry 118' does not generate a pixel clock or vertical synchronization signal. Instead, in this embodiment, the projection logic 104' generates a video clock 101, a frame synchronization signal 103, and a line synchronization signal 109, and sends those signals to the mirror control circuitry 118' of the projection subsystem 110'.

The mirror control circuitry 118' interprets the frame synchronization signal 103 as a vertical synchronization signal. Thus, the mirror control circuitry 118' uses the frame synchronization signal 103 to alter the drive signal 105 so as to time the deflection or oscillation of the one or more MEMS mirror 124 to effectuate scanning of the single laser beam in the vertical direction such that one cycle of vertical movement of the one or more MEMS mirrors 124 is completed and restarts when the frame synchronization signal 103 is asserted.

As stated, in the case where there are two MEMS mirrors 124, one for vertical scanning of the single laser beam and one for horizontal scanning of the single laser beam, one of those MEMS mirrors may be a resonance type mirror while the other may be a linear type mirror. The driving of a resonance type mirror is set, as it is defined by the resonance frequency of the mirror, although the driving of a linear type mirror can be modified as desired. Thus, where one of the MEMS mirrors 124 is a linear type mirror, which would typically be the mirror used for vertical scanning of the single laser beam, the driving of that mirror is easily modified to coincide with the frame synchronization signal 103. The mirror driven in resonance in configuration can be in sync with the mirror driven in resonance so that the geometry of the projection pattern 10 of FIG. 2 remains unchanging with a constant number of lines, and so that the projection logic 104' can predict or calculate the location of the laser beam. In order to help ensure that the quasi-statically driven mirror both in sync with the frame sync signal 103 of the video source 102' and the mirror driven in resonance, the adjustment of the speed of the quasi-statically driven mirror can be performed in flyback time when the laser beam is modulated so as to be off, and the quasi-statically driven mirror is returning to its initial position.

The memory 112 in conjunction with processing by the ASIC 114 is used to match the projection pattern to the line synchronization signal 109 of the horizontal line scanning of the laser beam and the line synchronization signal 109.

The advantages of this embodiment are similar to those of FIG. 1. Since the data rate and frame rate are matched between the video source 102 and the projection subsystem 110, the quasi-statically driven mirror is in sync with the mirror driven in resonance in order to help guarantee that the geometry of the projection pattern 10 of FIG. 2 remains unchanging and the projection logic 104' is able to calculate or determine the location of the laser beam on the projection surface 9. The amount of data stored by the memory 112 for buffering is very small, and is mainly used to compensate for momentary time rate differences provide time for error correction techniques to be performed and/or to synchronize the projection pattern 10 to the line synchronization signal 109. Also, here, because the mirror control circuitry 118 and laser driver 116 operate off the video clock 101, frame synchronization signal 103, and line synchronization signal 109, the operation of the video source 102 remains unmodified other than for the transmission of these signals.

Figure 4:
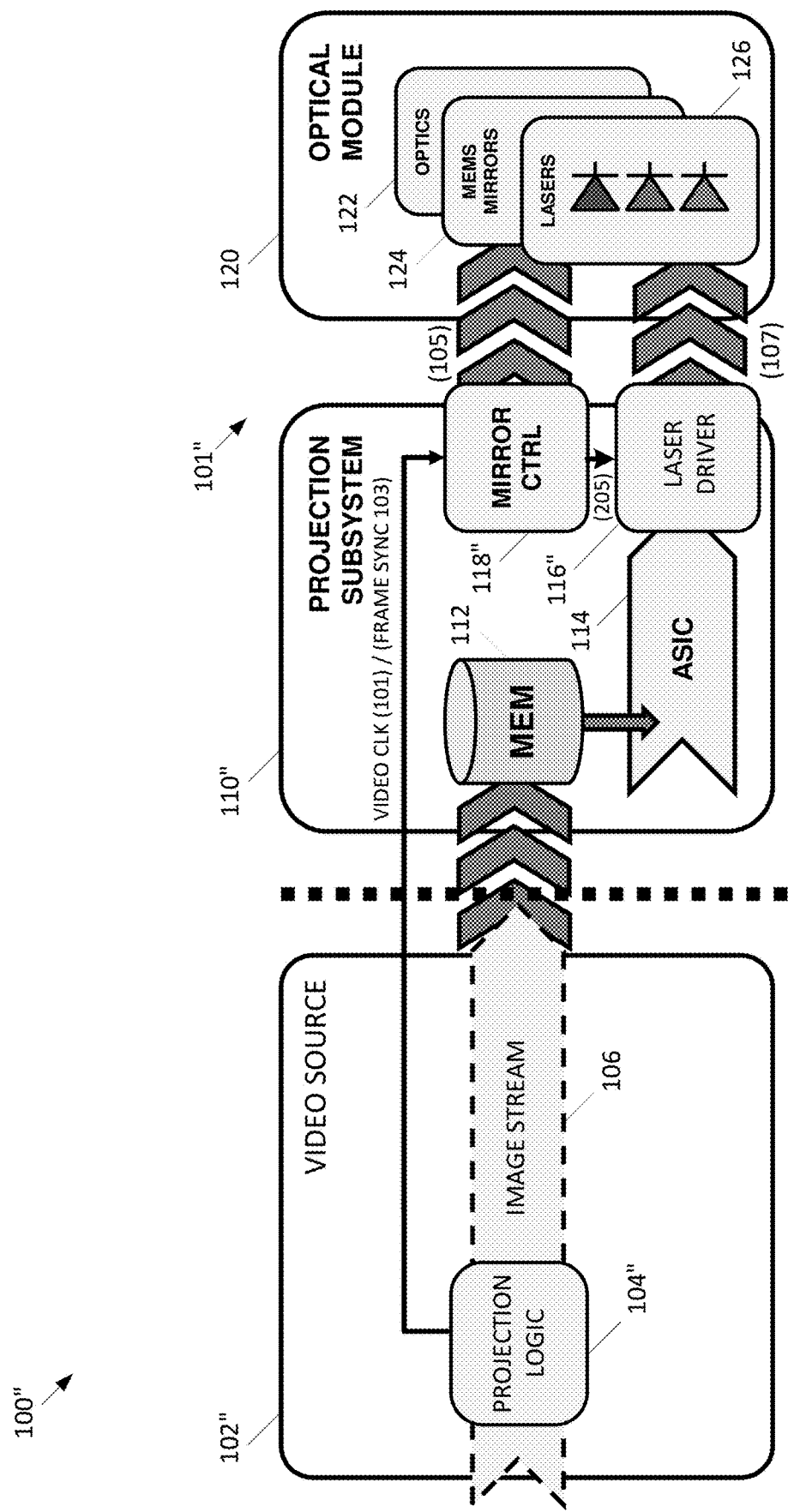
FIG. 4 is a block diagram showing a laser projection system including a video source and a laser scanning projector, in which the laser scanning projector receives a video clock signal and frame synchronization signal from the video source, in accordance with a third embodiment of this disclosure.

Another alternative embodiment of laser projection system 100" is now described with reference to FIG. 4. Here, the physical hardware of the video source 102", projection subsystem 110", and optical module 120 remains unchanged, as does the functionality, when compared to the laser projection system 100' of FIG. 3, with one exception. The exception is that in this embodiment, the quasi-statically driven mirror is not in sync with the mirror driven in resonance, and the geometry of the projection pattern 10 of FIG. 2 changes over time (as the number of lines is variable) due to the variation of the resonance frequency of the mirror driven in resonance. This means that the projection logic 104" is unable to predict or calculate the location of the laser beam. Therefore, in this system, the projection logic 104" does not send the line synchronization signal 109 to the mirror control circuitry 118" of the projection subsystem 110". Thus, here, the horizontal scanning of the single laser beam performed by the one or more MEMS mirrors 124 is independent of the line rate of the image stream 106. Instead, the ASIC 114" processes the received image stream, as buffered in the memory 112, to compensate for differences in beam location, as well as resolution and data rate, that could result from this decoupling of the scanning of the single laser beam from the line rate of the image stream 106. This is performed because in the embodiments of FIGS. 1 and 3, the projection pattern 10 was constant and the projection logic 104, 104' was able to predict the position of the laser beam, while in the embodiment of FIG. 4, the projection logic 104" cannot predict the position of the laser beam, as the projection pattern 9 is not constant over time. The compensation is performed by approximating the location of the single laser beam, and resampling of lines of the image stream 106 to match the actual location of the one or more MEMS mirrors 124 in a movement cycle. Appropriate information is sent by the ASIC 114" to the laser driver 116" to effect the modulation scheme appropriately.

This embodiment provides a variety of advantages. Implementation is simple since the one or more MEMS mirrors 124 run independently in one axis (e.g. horizontal axis), and thus that axis is not in sync with the other axis (e.g. vertical axis). In addition, due to the compensation performed by the ASIC 114", the video resolution can be different between the image stream 106 and the static or moving image 11 displayed on the projection surface 9.

It should be understood that references above to the Y-axis or vertical direction are referring to a slow axis of mirror movement or a slow axis mirror, and reference above to the X-axis or horizontal direction are referring to a fast axis of mirror movement or a fast axis mirror, and thus the actual direction of that fast axis and slow axis may not necessarily be horizontal, horizontal, or along the X-axis or Y-axis specifically.

While the above has been described with reference to the use of a laser scanning system to display a stream of images (in color) on a display surface, the above laser scanning system may be applied to three dimensional sensing, infrared projection, or a stream of monochrome images.

The invention claimed is:
1. A video projection system, comprising:
an optical module comprising at least one collimated light source configured to generate a light beam and at least one movable mirror configured to reflect the light beam;

a video source configured to produce a digital video stream in accordance with a clock signal and a movement synchronization signal;
a projector system comprising:
mirror control circuitry configured to control movement of the at least one movable mirror in accordance with the clock signal and the movement synchronization signal, wherein the mirror control circuitry sends the movement synchronization signal to the video source;
a light source controller configured to control generation of collimated light by the at least one collimated light source; and
processing circuitry configured to receive the digital video stream and to generate control signals for the light source controller based upon the received digital video stream.

2. The video projection system of claim 1, wherein the mirror control circuitry generates the movement synchronization signal as a function of desired scanning of the light beam in a vertical movement cycle by the at least one movable mirror, and wherein the movement synchronization signal indicates when the at least one movable mirror has completed scanning the light beam in the vertical movement cycle.

3. A video projection system comprising:
an optical module comprising at least one collimated light source configured to generate a light beam and at least one movable mirror configured to reflect the light beam;
a video source configured to produce a digital video stream in accordance with a clock signal and a movement synchronization signal;
a projector system comprising:
mirror control circuitry configured to control movement of the at least one movable mirror in accordance with the clock signal and the movement synchronization signal;
a light source controller configured to control generation of collimated light by the at least one collimated light source; and
processing circuitry configured to receive the digital video stream and to generate control signals for the light source controller based upon the received digital video stream;
wherein the video source receives the clock signal and the movement synchronization signal from the mirror control circuitry.

4. The video projection system of claim 3, wherein the clock signal, as received by the video source, is based upon the clock signal as sent by the mirror control circuitry.

5. The video projection system of claim 2, wherein the video projection system controls a frame rate of the digital video stream as a function of the movement synchronization signal.

6. The video projection system of claim 2, wherein the video projection system controls a resolution rate of the digital video stream as a function of the movement synchronization signal.

7. Control circuitry for a laser scanning projector, the control circuitry comprising:
mirror control circuitry configured to control movement of at least one movable mirror in accordance with a movement synchronization signal and a clock signal, wherein the mirror control circuitry is further configured to send the movement synchronization signal via a direct electrical connection to a video source;
a light source controller configured to control generation of a collimated light beam by at least one collimated light source; and
processing circuitry configured to receive a digital video stream and to generate control signals for the light source controller based upon the received digital video stream and the clock signal.

8. The control circuitry of claim 7, wherein the mirror control circuitry generates the movement synchronization signal as a function of desired scanning of the collimated light beam in a vertical movement cycle by the at least one movable mirror, and wherein the movement synchronization signal indicates when the at least one movable mirror has completed scanning the collimated light beam in the vertical movement cycle.

9. Control circuitry for a laser scanning projector, the control circuitry comprising:
mirror control circuitry configured to control movement of at least one movable mirror in accordance with a movement synchronization signal and a clock signal;
a light source controller configured to control generation of a collimated light beam by at least one collimated light source; and
processing circuitry configured to receive a digital video stream and to generate control signals for the light source controller based upon the received digital video stream and the clock signal;
wherein mirror control circuitry sends the clock signal and the movement synchronization signal to a video source.

10. A video projection system comprising:
an optical module comprising at least one collimated light source configured to generate a light beam and at least one movable mirror configured to reflect the light beam;
a video source configured to produce a digital video stream in accordance with a clock signal and a movement synchronization signal;
a projector system comprising:
mirror control circuitry configured to control movement of the at least one movable mirror in accordance with the clock signal and the movement synchronization signal,
a light source controller configured to control generation of collimated light by the at least one collimated light source; and
processing circuitry configured to receive the digital video stream and to generate control signals for the light source controller based upon the received digital video stream;
wherein the video source is directly electrically connected to the mirror control circuitry to directly send the movement synchronization signal to the mirror control circuitry.

11. Control circuitry for a laser scanning projector, the control circuitry comprising:
mirror control circuitry configured to control movement of at least one movable mirror in accordance with a movement synchronization signal and a clock signal, wherein the mirror control circuitry is further configured to directly receive the movement synchronization signal over a direct electrical connection with a video source;
a light source controller configured to control generation of a collimated light beam by at least one collimated light source; and processing circuitry configured to receive a digital video stream and to generate control signals for the light source controller based upon the received digital video stream and the clock signal.

12. The control circuitry of claim 11, wherein the movement synchronization signal includes a frame synchronization signal and a line synchronization signal; wherein the frame synchronization signal indicates when a frame of the digital video stream is complete; and wherein the line synchronization signal indicates when a line of a frame of the digital video stream is complete.

13. The control circuitry of claim 11, wherein the movement synchronization signal includes a frame synchronization signal; and wherein the frame synchronization signal indicates when a frame of the digital video stream is complete.

14. The control circuitry of claim 11, wherein the mirror control circuitry and light source controller operate based upon the clock signal and the movement synchronization signal so as to effectuate display output of the digital video stream at a same frame rate as the digital video stream.

15. The video projection system of claim 10, wherein the movement synchronization signal includes a frame synchronization signal and a line synchronization signal; wherein the frame synchronization signal indicates when a frame of the digital video stream is complete; and wherein the line synchronization signal indicates when a line of a frame of the digital video stream is complete.

16. The video projection system of claim 10, wherein the movement synchronization signal includes a frame synchronization signal; and wherein the frame synchronization signal indicates when a frame of the digital video stream is complete.

17. The video projection system of claim 10, wherein the mirror control circuitry and light source controller operate based upon the clock signal and the received movement synchronization signal so as to effectuate display output of the digital video stream at a same frame rate as the digital video stream.

18. The control circuitry of claim 9, wherein the mirror control circuitry generates the movement synchronization signal as a function of desired scanning of the collimated light beam in a vertical movement cycle by the at least one movable mirror, and wherein the movement synchronization signal indicates when the at least one movable mirror has completed scanning the collimated light beam in the vertical movement cycle.

* * * * *